United States Patent
Bencar et al.

(10) Patent No.: US 10,534,811 B2
(45) Date of Patent: Jan. 14, 2020

(54) ARTIFICIAL INTELLIGENCE METHODOLOGY TO AUTOMATICALLY GENERATE INTERACTIVE PLAY ALONG SONGS

(71) Applicants: Gary Bencar, Haiku, HI (US); Todd Nystrom, Renton, WA (US)

(72) Inventors: Gary Bencar, Haiku, HI (US); Todd Nystrom, Renton, WA (US)

(73) Assignee: BEAMZ IP, LLC

( * ) Notice: Subject to any disclaimer, the term of this patent is extended or adjusted under 35 U.S.C. 154(b) by 0 days.

(21) Appl. No.: 16/036,052

(22) Filed: Jul. 16, 2018

(65) Prior Publication Data
US 2019/0236209 A1 Aug. 1, 2019

Related U.S. Application Data

(60) Provisional application No. 62/623,131, filed on Jan. 29, 2018.

(51) Int. Cl.
*G06F 16/638* (2019.01)
*G10H 1/00* (2006.01)

(52) U.S. Cl.
CPC ......... *G06F 16/639* (2019.01); *G10H 1/0008* (2013.01); *G10H 2210/076* (2013.01)

(58) Field of Classification Search
CPC ............... G06F 16/639; G10H 1/0008; G10H 2210/076
USPC .......................................................... 84/609
See application file for complete search history.

(56) References Cited

U.S. PATENT DOCUMENTS

| | | | | |
|---|---|---|---|---|
| 7,667,125 B2* | 2/2010 | Taub | ........................ | G10H 1/00 84/616 |
| 7,956,276 B2* | 6/2011 | Sako | .................. | H04N 21/6547 84/609 |
| 8,115,090 B2* | 2/2012 | Miyajima | ............ | G10H 1/0025 84/625 |
| 9,111,519 B1* | 8/2015 | Yang | ........................ | G10H 1/40 |
| 2001/0039872 A1* | 11/2001 | Cliff | ..................... | G10H 1/0033 84/609 |
| 2003/0094093 A1* | 5/2003 | Smith | .................. | G10H 1/0058 84/609 |
| 2008/0271592 A1* | 11/2008 | Beckford | ............. | G10H 1/0008 84/645 |
| 2009/0048694 A1* | 2/2009 | Matsuda | .................. | G10H 1/40 700/94 |
| 2014/0018947 A1* | 1/2014 | Ales | ....................... | G11B 20/10 700/94 |

* cited by examiner

*Primary Examiner* — Jeffrey Donels
(74) *Attorney, Agent, or Firm* — Culhane Meadows PLLC; Robert Klinger

(57) ABSTRACT

A method and system of using Artificial Intelligence to automatically create and generate an interactive play-along song from a selected audio file/song imported from either a music streaming service, a personal music library and the like, that can later be played on an interactive music engine.

16 Claims, 7 Drawing Sheets

| Note | Octv | Nbr | Note | Octv | Nbr | Note | Octv | Nbr | Note | Octv | Nbr | Note | Octv | Nbr | Note | Octv | Nbr |
|---|---|---|---|---|---|---|---|---|---|---|---|---|---|---|---|---|---|
| C | 0 | 0 | C | 2 | 24 | C | 4 | 48 | C | 6 | 72 | C | 8 | 96 | C | 10 | 120 |
| C# | 0 | 1 | C# | 2 | 25 | C# | 4 | 49 | C# | 6 | 73 | C# | 8 | 97 | C# | 10 | 121 |
| D | 0 | 2 | D | 2 | 26 | D | 4 | 50 | D | 6 | 74 | D | 8 | 98 | D | 10 | 122 |
| D# | 0 | 3 | D# | 2 | 27 | D# | 4 | 51 | D# | 6 | 75 | D# | 8 | 99 | D# | 10 | 123 |
| E | 0 | 4 | E | 2 | 28 | E | 4 | 52 | E | 6 | 76 | E | 8 | 100 | E | 10 | 124 |
| F | 0 | 5 | F | 2 | 29 | F | 4 | 53 | F | 6 | 77 | F | 8 | 101 | F | 10 | 125 |
| F# | 0 | 6 | F# | 2 | 30 | F# | 4 | 54 | F# | 6 | 78 | F# | 8 | 102 | F# | 10 | 126 |
| G | 0 | 7 | G | 2 | 31 | G | 4 | 55 | G | 6 | 79 | G | 8 | 103 | G | 10 | 127 |
| G# | 0 | 8 | G# | 2 | 32 | G# | 4 | 56 | G# | 6 | 80 | G# | 8 | 104 | | | |
| A | 0 | 9 | A | 2 | 33 | A | 4 | 57 | A | 6 | 81 | A | 8 | 105 | | | |
| A# | 0 | 10 | A# | 2 | 34 | A# | 4 | 58 | A# | 6 | 82 | A# | 8 | 106 | | | |
| B | 0 | 11 | B | 2 | 35 | B | 4 | 59 | B | 6 | 83 | B | 8 | 107 | | | |
| C | 1 | 12 | C | 3 | 36 | C | 5 | 60 | C | 7 | 84 | C | 9 | 108 | | | |
| C# | 1 | 13 | C# | 3 | 37 | C# | 5 | 61 | C# | 7 | 85 | C# | 9 | 109 | | | |
| D | 1 | 14 | D | 3 | 38 | D | 5 | 62 | D | 7 | 86 | D | 9 | 110 | | | |
| D# | 1 | 15 | D# | 3 | 39 | D# | 5 | 63 | D# | 7 | 87 | D# | 9 | 111 | | | |
| E | 1 | 16 | E | 3 | 40 | E | 5 | 64 | E | 7 | 88 | E | 9 | 112 | | | |
| F | 1 | 17 | F | 3 | 41 | F | 5 | 65 | F | 7 | 89 | F | 9 | 113 | | | |
| F# | 1 | 18 | F# | 3 | 42 | F# | 5 | 66 | F# | 7 | 90 | F# | 9 | 114 | | | |
| G | 1 | 19 | G | 3 | 43 | G | 5 | 67 | G | 7 | 91 | G | 9 | 115 | | | |
| G# | 1 | 20 | G# | 3 | 44 | G# | 5 | 68 | G# | 7 | 92 | G# | 9 | 116 | | | |
| A | 1 | 21 | A | 3 | 45 | A | 5 | 69 | A | 7 | 93 | A | 9 | 117 | | | |
| A# | 1 | 22 | A# | 3 | 46 | A# | 5 | 70 | A# | 7 | 94 | A# | 9 | 118 | | | |
| B | 1 | 23 | B | 3 | 47 | B | 5 | 71 | B | 7 | 95 | B | 9 | 119 | | | |

FIGURE 2

| Scale Note Template: C Major Scale | | | | | | | |
|---|---|---|---|---|---|---|---|
| Note: | C0 | D0 | E0 | F0 | G0 | A0 | B0 |
| Midi # | 0 | 2 | 4 | 5 | 7 | 9 | 11 |

| Scale Note Template: C Minor Scale | | | | | | | |
|---|---|---|---|---|---|---|---|
| Note: | C0 | D0 | D#0 | F0 | G0 | A0 | B0 |
| Midi # | 0 | 2 | 3 | 5 | 7 | 9 | 11 |

FIGURE 4

Global Key Offset +7

| Seed Notes: G Major Scale | | | | | | | |
|---|---|---|---|---|---|---|---|
| GK Offset | +7 | +7 | +7 | +7 | +7 | +7 | +7 |
| Note: | G0 | A0 | B0 | C1 | D1 | E1 | F#1 |
| Midi # | 7 | 9 | 11 | 12 | 14 | 16 | 18 |

FIGURE 5

Key = C Major

| Region #1 Seed Notes (Offset +0) | | | | | | | |
|---|---|---|---|---|---|---|---|
| Offset | +0 | +0 | +0 | +0 | +0 | +0 | +0 |
| Note: | C0 | D0 | E0 | F0 | G0 | A0 | B0 |
| Midi # | 0 | 2 | 4 | 5 | 7 | 9 | 11 |

Key = F Major

| Region #2 Seed Notes (Offset +5) | | | | | | | |
|---|---|---|---|---|---|---|---|
| Offset | +5 | +5 | +5 | +5 | +5 | +5 | +5 |
| Note: | F0 | G0 | A0 | A#0 | C1 | D1 | E1 |
| Midi # | 5 | 7 | 9 | 10 | 12 | 14 | 16 |

FIGURE 6

Selectable Instruments Example

| Instrument Name | DLS Name | Patch | Lo Octave | Hi Octave |
|---|---|---|---|---|
| Upright Bass | AccousticBass.DLS | BassUp5 | 3 | 4 |
| Electric Piano | WurlitzerKeys.DLS | EPiano1 | 2 | 6 |

- 61 — Instrument Name
- 62 — DLS Name
- 63 — Patch
- 64 — Lo Octave
- 65 — Hi Octave 66 —— Octave Range (Computed): 2 Octaves

67 —— Octave (Range) Offsets
Upright Bass: +36 (Octave#3); +48 (Octave#4)
Electric Piano: +24(Octave#2), +36(Octave#3), +48 (Octave#4), +60 (Octave#), +72 (Octave#6)

FIGURE 7

Preliminary Seed Notes (2 Octaves) for Upright Bass Instrument — 70

| Note: | C0 | D0 | E0 | F0 | G0 | A0 | B0 | C1 | D1 | E1 | F1 | G1 | A1 | B1 | — 71 |
|---|---|---|---|---|---|---|---|---|---|---|---|---|---|---|---|
| Midi # | 0 | 2 | 4 | 5 | 7 | 9 | 11 | 12 | 14 | 16 | 17 | 19 | 21 | 23 | — 72 |

FIGURE 8

Instrument Note Pool — Region #1 Note Pool for Upright Bass

| | Octave 3  Offset: (3 X 12 = 36) | | | | | | | Octave 4  Offset: (4 X 12 = 48) | | | | | | | |
|---|---|---|---|---|---|---|---|---|---|---|---|---|---|---|---|
| Global Root Key Offset | +0 | +0 | +0 | +0 | +0 | +0 | +0 | +0 | +0 | +0 | +0 | +0 | +0 | +0 | — 24 |
| Instrument Octave Offset | +36 | +36 | +36 | +36 | +36 | +36 | +36 | +48 | +48 | +48 | +48 | +48 | +48 | +48 | — 67 |
| Song Region Offset | +0 | +0 | +0 | +0 | +0 | +0 | +0 | +0 | +0 | +0 | +0 | +0 | +0 | +0 | — 84 |
| Midi # | 36 | 38 | 40 | 41 | 43 | 45 | 47 | 48 | 9 | 10 | 11 | 12 | 13 | 14 | — 85 |
| Note Pool | C3 | D3 | E3 | F3 | G3 | A3 | B3 | C4 | D4 | E4 | F4 | G5 | A5 | B5 | — 86 |
| Index ID | 1 | 2 | 3 | 4 | 5 | 6 | 7 | 8 | 9 | 10 | 11 | 12 | 13 | 14 | — 87 |

Instrument Note Pool — Region #2 Note Pool for Upright Bass

| | Octave 3 (3 X 12 = 36) | | | | | | | Octave 4 (4 X 12 = 48) | | | | | | | |
|---|---|---|---|---|---|---|---|---|---|---|---|---|---|---|---|
| Global Root Key Offset | +0 | +0 | +0 | +0 | +0 | +0 | +0 | +0 | +0 | +0 | +0 | +0 | +0 | +0 | — 24 |
| Instrument Octave Offset | +36 | +36 | +36 | +36 | +36 | +36 | +36 | +48 | +48 | +48 | +48 | +48 | +48 | +48 | — 67 |
| Song Region Offset | +5 | +5 | +5 | +5 | +5 | +5 | +5 | +5 | +5 | +5 | +5 | +5 | +5 | +5 | — 84 |
| Midi # | 41 | 43 | 45 | 46 | 48 | 50 | 52 | 53 | 55 | 57 | 58 | 60 | 62 | 64 | — 85 |
| Note Pool | F3 | G3 | A3 | A#3 | C3 | D4 | E4 | F4 | G4 | A4 | A#4 | C5 | D5 | E5 | — 86 |
| Index ID | 1 | 2 | 3 | 4 | 5 | 6 | 7 | 8 | 9 | 10 | 11 | 12 | 13 | 14 | — 87 |

FIGURE 9

Example: A 13-step pattern to play "Mary Had a Little Lamb" in Octave#3 using Key Indices:

Pattern values: 3, 2, 1, 2, 3, 3, 3, 2, 2, 2, 3, 5, 5

Region Offset = 0
Key: C Major

| | Region #1 Mary Had a Little Lamb (Octave 3) | | | | | | | | | | | | | — 91 |
|---|---|---|---|---|---|---|---|---|---|---|---|---|---|---|
| Index ID | 3 | 2 | 1 | 2 | 3 | 3 | 3 | 2 | 2 | 2 | 3 | 5 | 5 | — 92 |
| Midi Note | E | D | C | D | E | E | E | D | D | D | E | G | G | — 93 |

Region Offset = +5
Key: F Major

| | Region #2 Mary Had a Little Lamb (Octave 3) | | | | | | | | | | | | | — 91 |
|---|---|---|---|---|---|---|---|---|---|---|---|---|---|---|
| Index ID | 3 | 2 | 1 | 2 | 3 | 3 | 3 | 2 | 2 | 2 | 3 | 5 | 5 | — 92 |
| Midi Note | A | G | F | G | A | A | A | G | G | G | A | C | C | — 93 |

FIGURE 10

ARTIFICIAL INTELLIGENCE METHODOLOGY TO AUTOMATICALLY GENERATE INTERACTIVE PLAY ALONG SONGS

TECHNICAL FIELD

The present disclosure relates to the use of Artificial Intelligence to automatically create and generate a multi instrument/sound/note interactive play-along song from a selected audio file/song imported from either a music streaming service, a personal music library and the like.

BACKGROUND

Interactive play-along songs can be played by a multi-media platform, such as available from Beamz Interactive, Inc. of Scottsdale Ariz. Such a platform is described in commonly assigned U.S. Pat. Nos. 7,504,577, 7,858,870, 9,542,919 and 9,646,588, the teachings of each which are incorporated herein by reference in their entirety.

The Beamz Cross Platform (i.e. IOS, Android, PC, MAC, AR, MR, VR, etc.) Interactive Music Engine is an award winning rich multi-media technology and platform configured to allow a user to selectively trigger various triggers each associated with a subset of a musical composition, to both compose and play sympathetic music. Different subsets/Midi files of a musical composition can be selectively assigned to the triggers. The platform includes triggers, and an electronic processor generating a control signal as a function of the triggers selected by a user. The electronic processor also generates the control signal as a function of a plurality of music programs. Each music program comprises sound elements comprising a subset of a musical composition, and the music programs are correlated to each other. The electronic processor generates audio signals indicative of audible musical sounds as a function of the control signal.

There is a need to use Artificial Intelligence to automatically create and generate a multi instrument/sound/note interactive play-along song from a selected audio file/song imported from either a music streaming service, a personal music library and the like, that can later be played on an interactive music engine.

SUMMARY

This disclosure comprises a method and system of using Artificial Intelligence to automatically create and generate an interactive play-along song from a selected audio file/song imported from either a music streaming service, a personal music library and the like, that can later be played on an interactive music engine.

BRIEF DESCRIPTION OF THE DRAWINGS

The accompanying drawings, which are included to provide a further understanding of the invention and are incorporated in and constitute a part of this specification, illustrate embodiments of the disclosure and together with the description serve to explain the principles of the disclosure.

FIG. 2 illustrates the Standard Midi numbering scheme used by an application engine;

FIG. 4 illustrates the Scale based, templates that supply generic notes for further transpositions, and illustrates two possible Scale Note Templates;

FIG. 5 illustrates how a Global Key Offset transposes the preliminary Scale Note pool to become a Seed Note Pool in the scanned song (root) key;

FIG. 6 illustrates how Global Regional Offsets are used to dynamically transpose Seed Notes to accommodate key changes during song play;

FIG. 7 illustrates two selectable Instruments and their definitions;

FIG. 8 illustrates how the preliminary seed note pool is expanded by the application engine to fill an Instrument's specific Octave Range;

FIG. 9 illustrates how Offsets are dynamically applied by application engine 1007 to an Instrument's preliminary seed note pool to produce a playable sympathetic note pool in real time;

FIG. 10 shows an example of a 13 step Melody Pattern that will play "Mary Had a Little Lamb" melody in any Key and on any Instrument.

DETAILED DESCRIPTION

Interactive Music Engine

This disclosure is directed to using Artificial Intelligence to automatically create and generate an interactive play-along song from a selected audio file/song imported from either a music streaming service, a personal music library and the like. The generated interactive play-along song can be played by a multi-media platform, such as available from Beamz Interactive, Inc. of Scottsdale Ariz. Such a platform is described in commonly assigned U.S. Pat. Nos. 7,504,577, 7,858,870, 9,542,919 and 9,646,588, the teachings of which are incorporated herein by reference in their entirety. These methods and illustrations show interactive music content being generated for direct use with the Beams Interactive Music Engine. However, all song properties and generated note pools can be used by other music engines as long as they can accommodate Tempo and Key changes throughout a song; and they can use pools of sympathetic notes that are appropriate to the key changes as the song plays.

The Beamz Interactive Music Engine includes an electronic processor generating a control signal as a function of trigger objects selected by a user, the electronic processor also generating the control signal as a function of a plurality of music programs, wherein each said music program comprises sound elements comprising a subset of a musical composition, and the music programs are correlated to each other, the electronic processor generating an audio signals indicative of audible musical sounds as a function of the control signal.

Figure 1:
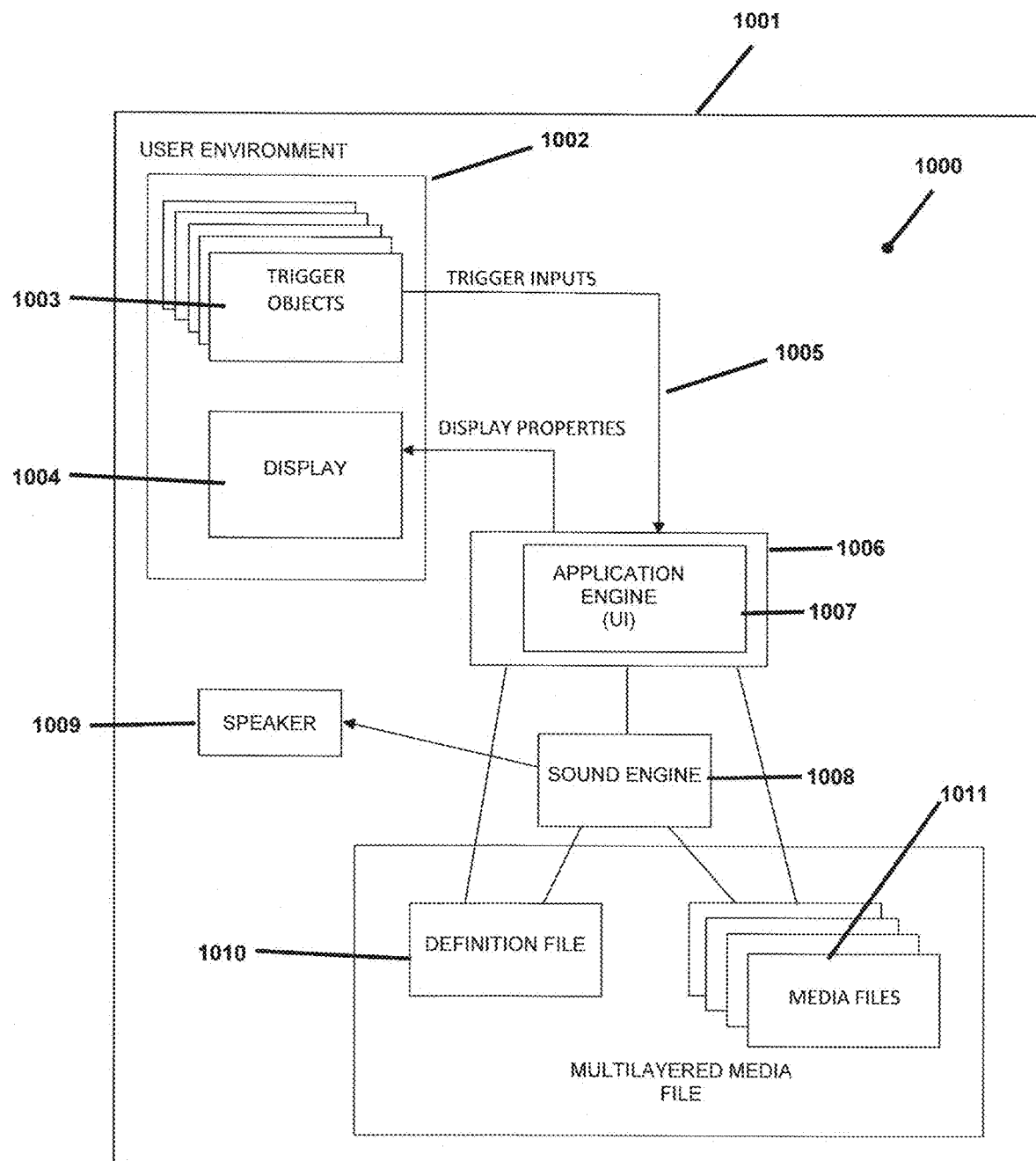
FIG. 1 illustrates a diagram of a system for multilayered media playback.

FIG. 1 illustrates a diagram of a system 1000 for multi-layered media playback.

The system 1000 can be implemented in electronic device 1001, and embodied as one of a computer, a smart phone, a tablet, a touchscreen computer, and the like having a display 1004.

Application engine 1007 is operable on an electronic processor 1006 and receives one or more inputs 1005 from the multiple trigger objects 1003 within the application environment 1001.

Application engine 1007 controls playback of media files 1011 that are combined to form a multilayered media file based on one or more of trigger inputs 1005, and definition file 1010 via sound engine 1008. The media files 1011 can be one or more MIDI files, samples such as .wav and .mp3 files, video files in a plurality of formats, and/or any other audio or video file format.

With a short trigger break, the trigger 1003 is held broken for a substantially short period of time, such as with a threshold for the short period of time of 0.5 seconds or less. The application engine 1007 can use the short break to trigger a one-shot, play a single note in a streamed sequence, or start and stop a loop.

With a long trigger break, the trigger 1003 is held broken for a longer period of time, such as with a threshold for the longer period of time of 0.5 seconds or more. Additional thresholds may be used for long trigger breaks with each threshold associated with a different action to be taken by the application engine 1007.

The application engine 1007 can use a long trigger break to Pulse (stream) notes.

Processor 1006 is configured such that visual outputs from application engine 1007 are displayed on display 1004 and output from sound engine 1008 is played on speaker 1009.

The combination of application engine 1007 and sound engine 1008 form an application on the processor 1006. The processor 1006 is configured to selectively associate a music programs with each of the plurality of trigger objects. The processor 1006 is configured such that when one of the trigger objects 1003 is in a first state for a prolonged period of time successive said audible musical sounds are generated, such that, for instance, the musical program associated with the trigger object continues to play uninterrupted, along with any other music programs that are playing in response the associated trigger object being triggered.

Display 1004 displays the application environment 1002.

When a trigger object 1003 is triggered by a user, trigger-specific visual output from application engine 1007 can be shown to alter the display properties or attributes of any element in the display 1004.

FIG. 2 illustrates the Standard Midi numbering scheme used by application engine 1007 according to the methods of this disclosure. All illustrations & examples herein are based on the Standard Midi Note Numbering scheme.

Midi is based on a chromatic music scale that breaks an octave into 12 notes (semitones) shown at 11. There are 128 possible Midi notes 11 spanning 10 octaves, shown at 12.

The lowest possible Midi note 11 is "C" in Octave #0 shown at 101, the highest Midi note 11 is "G" in Octave #10 shown at 102.

As illustrated in FIG. 2, each Midi note 11 is identified by its Key followed by the Octave 12 in which the Key falls. For example, Midi note C5 represents Middle "C" in Octave #5 shown at 103.

All Midi notes 11 are numbered at 13 sequentially from the lowest to the highest (0-127)

By using a combination of generic Offset Templates, this standard Midi note numbering scheme is used as a foundation for numerically generating play-along musical notes that will always be sympathetic or compatible with the analyzed audio file/song in real time.

Figure 3:
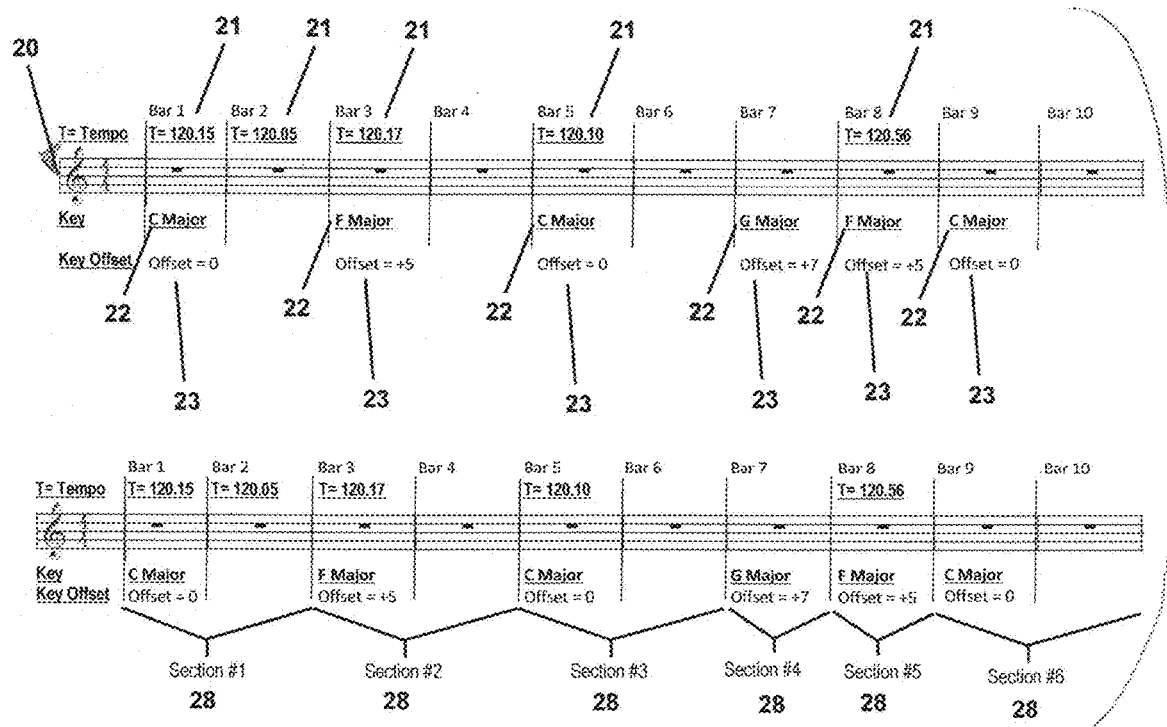
FIG. 3 illustrates a Virtual Song map prepared by the application engine.

FIG. 3 illustrates a Virtual Song map 20. This Virtual Song map 20 is a graphic (Music Staff) illustration that is prepared by application engine 1007 executing on processor 1006 from scanning an imported audio file/song file according to this disclosure.

When the song is played by application engine 1007 and song engine 1008, it follows this Virtual Song map 20, responding to the markers as they are encountered.

This example shows the data derived by application engine 1007 from performing Tempo & Chromatic analysis on a sample 10 bar (audio) audio file/song that was recorded in the key of C major at an approximate tempo of 120 BPM.

The application engine 1007 performs Tempo Analysis on the audio file/song to place Tempo value markers 21 in the Virtual Song map 20 to establish or change the tempo at that point in the audio file/song. When a Tempo value marker 21 is encountered during playback, the current Tempo is set to the value contained in the Tempo value marker 21.

The application engine 1007 performs Chromatic Analysis to add Regional Key markers 22 to the Virtual Song map 20 to indicate chromatic changes and their location within the audio file/song.

Each Regional Key marker 22 contains the chromatic global Region Key Offset 23 needed to transpose Seed Notes 42 from the detected Root Key 26 to Region specific Seed Notes 52 in the new key.

For example, if the audio file/song is detected to be in C, and the scan detects that, during play, the key changes to F, a Regional Key marker 22 is placed at that location in the Virtual Song map 20 with an offset value 23 of +5.

When a Regional Key marker 22 is encountered during playback of the audio file/song, the global Region Key Offset 23 is set to the value contained in the marker 22.

The application engine 1007 creates Song Sections (Chromatic Regions) shown at 28. Each chromatic region 28 becomes a Song Section (subset of song) in the song's definition as a whole and it marks a key change in the audio file/song.

In this example, there are 6 Song Sections 28—each having their own properties: Key 22, Regional (key) offset 23, and Length 25.

The combined lengths 25 of all the Song Sections 28 constitute the song's main loop length 29.

Use of Transposition Offsets

The following methods for generating sympathetic note pools are based on the use and application of multiple "Offsets".

All generated play-along notes begin from preprogrammed scale notes which are generated from standard templates, in a standard key, within a standard octave.

The offsets described herein are used to transpose these notes to a different key as required by the audio file/song.

Offsets are expressed as semitone values—the number of semitones a given (root) note needs to be transposed into the target note.

For the sake of simplicity, all illustrations and methods described herein use the standard MIDI note numbering scheme to easily show how notes can be transposed by semitones.

However, these transposition offset methods apply to both MIDI notes and note samples as well.

With root notes in MIDI format, the offset amount is added to the MIDI note number for the root note to obtain the MIDI note number of the target note.

With sampled notes, audio transposition software is used to apply an offset value to transpose a sampled root note to a sample in the frequency of the target key.

FIG. 4 illustrates the Scale based templates that supply generic notes for further transpositions, and illustrates two possible Scale Note Templates.

After chromatic scanning is completed by application engine 1007, the scanned key data is used to select an appropriate seed note template 31 for the scanned audio file/song. A Global Root Key Offset 24 (FIG. 5) is established that, when applied, transposes the templated scale note pool 32 from the key of C to the detected key for the song.

All Note Templates are based on the standard Midi note numbering scheme (FIG. 2) and are prepared in the key of C with a Root Note of C0 101 (lowest possible Midi note).

Scale note templates supply the preliminary note, pool 32 that is musically sympathetic to the overall scanned audio file/song. Their associated Midi note numbers 33 are used to mathematically transpose them to the proper key and octave as needed.

FIG. 5 illustrates how a Global Key Offset transposes the preliminary Scale Note pool 32 to become a Seed Note Pool 42 in the scanned song (root) key.

After chromatic scanning is complete, the scanned key data is used to determine a Global Root Key Offset 24 which is applied to transpose the preliminary sympathetic note pool 32 from the key of C to the detected key for the audio file/song.

In this illustration, the chromatic scanning determined the audio file/song to be in the key of G Major and the Global Root Key Offset 24 is set to +7. Adding this offset to the Midi note numbers from the C Major template 33 transposes the seed note pool to the key of G Major 42, 43.

For the Sake of Simplicity, all Other Figures are Illustrated with an Example Song in the Key of C. (Global Key Offset=0)

FIG. 6 illustrates how Global Regional Offsets 23 are used to dynamically transpose Seed Notes to accommodate key changes during song play.

As the audio file/song plays, and (chromatic) Song. Section markers are encountered, the current Regional Offset 23 is set to the offset value contained in the marker 23 in real time. This ensures that all triggered notes will be in the proper key for what the song is currently playing.

In this example, Region #1 plays in the key of C major while Region #2 is transposed to the key of F major.

FIG. 7 illustrates two selectable Instruments and their definitions.

All predefined instrument choices contain information necessary to use that instrument in a musical composition. If the notes to be played are MIDI, each instrument 61 must be assigned to a Midi Synthesizer Patch 63 within a downloadable sound set 62. The ideal Octave Range for each instrument is determined from the Low 64 & High 65 Octave values. In FIG. 7, the octave range for the upright bass is two octaves; the octave range for the electric piano is five octaves.

FIG. 8 illustrates how the preliminary seed note pool 42 is expanded by application engine 1007 to fill an Instrument's specific Octave Range.

For each Instrument selected by the user:

The Octave Range 66 is calculated from the Low Octave 64 and High Octave 65 values.

Octave Range Offsets 67 are established for each Octave contained in the Octave Range 66.

For example, all Seed Note Pools 42 are always generated for Octave #0.

If an instrument sounds best in octave #5, the offset value (in chromatic semi-tones) would be +60 (5×12 semis).

Using the Octave Range Offsets 67, one set of preliminary Seed Notes 71 is generated for each octave contained in the Octave Range 66.

FIG. 9 illustrates how Offsets are dynamically applied by application engine 1007 to an Instrument's preliminary seed note pool to produce a playable sympathetic note pool in real time.

All of an Instrument's play-notes start out as standard Scale Notes contained in a Scale Note Template 31. The appropriate template is indicated by chromatic analysis of the imported song. Chromatic analysis also sets the Global Key Offset 24 (See FIG. 5).

The Global Key Offset 24 is added to the Midi Note numbers 33 of the appropriate Scale Note template 31 which transposes them into Seed Notes 42 in the Detected Root Key 26 of the scanned song. (See FIG. 5).

Instrument Octave Offsets 67 are added to the Midi Note numbers 72 of the Preliminary Seed Notes 70. This transposes them to be within the Instrument's specified Octave Ranges 64-65.

Octave Offsets 67 are used to generate Preliminary Seed Notes 71 for all octaves that fall within the range specified by the Low Octave 64 and High Octave 65 properties from the Instrument definition 61.

As the application engine 1007 plays the audio file/song in real time, and (chromatic) Song Section markers are encountered, the Global Region Offset 84 is set to the offset value contained in the marker 23. This ensures that all triggered notes will be in the proper key for what the song is currently playing.

Each note in the note pool 86 has its own Index ID, 87 which is not affected by any of the Offset values. This index establishes a way to retrieve and play the same melodic pattern across all Regions of the song. See FIG. 10.

FIG. 10 illustrates how Melody Patterns work. Melody patterns establish a sequential list of notes (melodies) that can be retrieved from an Instrument's Sympathetic Note Pool 86 and played when a user triggers them.

Melody patterns are predefined within software executing in the application engine 1007. They are required for playback and can be either selected or established as defaults for an Instrument.

Melody Patterns can have an unlimited number of steps.

The same Melody Pattern can be used across all chromatic regions in a song by dynamically adjusting the Regional Offset 84.

Any Melody Pattern can be used with any Instrument.

To provide flexibility across all keys, Melody Patterns do not directly reference the pattern notes by their. Key designation 86. Instead, the notes are referenced by their Index ID 87 within the Instrument's Sympathetic Note Pool (FIG. 9). This makes a Melody Pattern transparent to the Key or Octave to which it applies.

FIG. 10 shows an example of a 13 step Melody Pattern that will play "Mary Had a Little Lamb" melody in any Key and on any Instrument.

Figure 11:
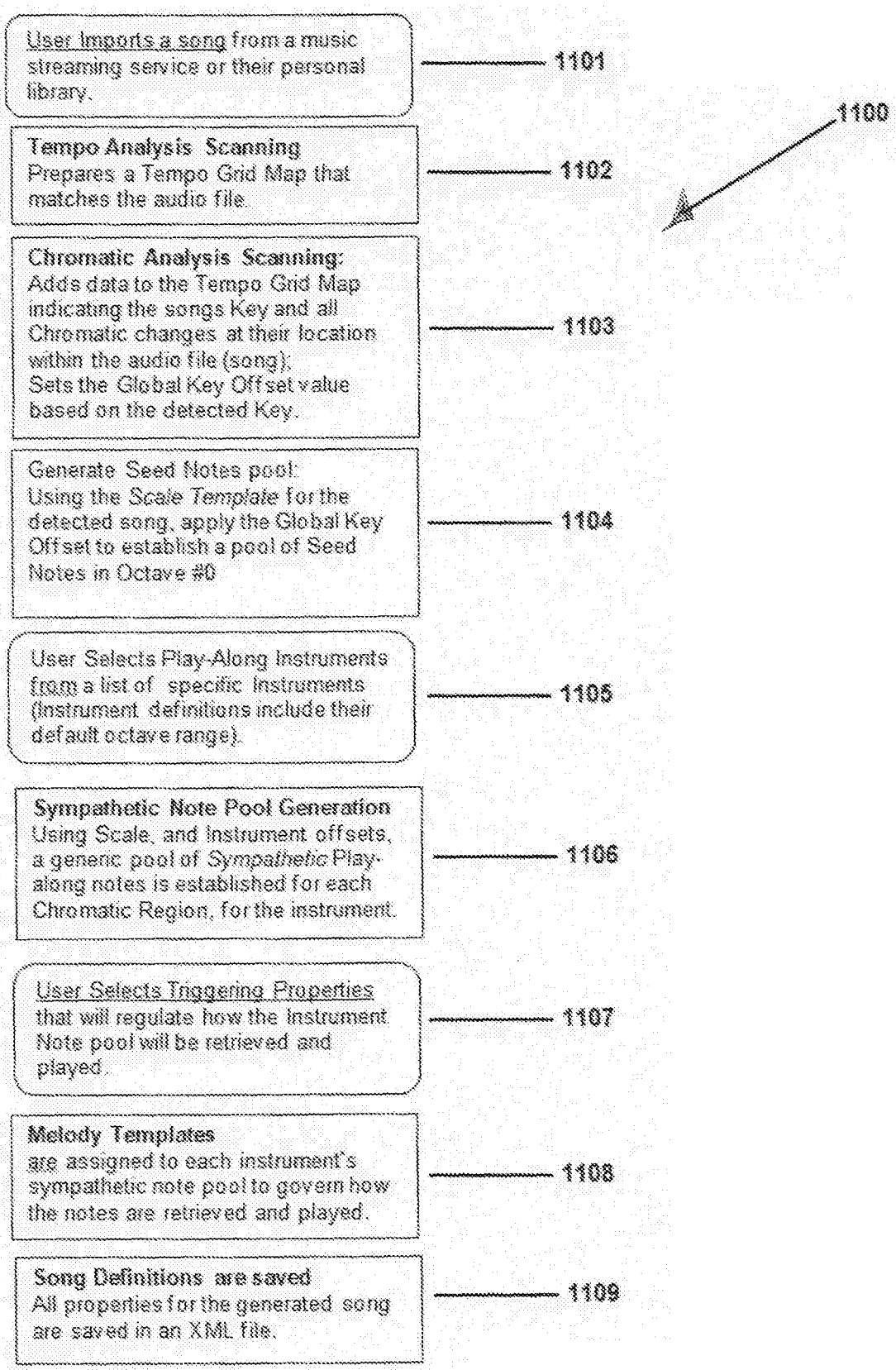
FIG. 11 illustrates the main processing flow executable by the application engine configured to generate an interactive play-along song according to this disclosure.

FIG. 11 illustrates the main processing flow 1100 executable by application engine 1007 configured to generate an interactive play-along song according to this disclosure.

At step 1101 the application engine 1007 receives a user selection of an audio file/song to import the audio file/song from either a music streaming service or from a personal music library, and the like.

The imported audio file/song must be in a standard audio format such as .wav or .mp3, or the like. A preliminary Virtual Song map 20 is established showing the length of the overall song, its measure alignment grid, tempo setting markers, and where they occur in the audio file/song as it is played. A link to the imported file 27 is saved as part of the song definitions in definition file 1010. The length of the imported song 28 is saved as part of the song definitions.

At step 1102 the imported audio file/song is software scanned by application engine 1007 to determine its beat points (tempo), and its beat/measure alignments (time signature). The results of the scan are used by application engine 1007 to prepare a Virtual Song map 20 for the entire song by placing Tempo markers into the map at the appropriate locations along its length, as previously discussed, as shown in FIG. 3.

At step 1103 the imported audio file is software analyzed by application engine 1007 to determine its overall key 26.

The audio file is also scanned along its length to determine key changes and mark where they occur.

Regional Key indicator markers 22 are placed in the virtual Song Map 20 at the appropriate locations along its length.

All predesigned Key/Scale templates 31 contain a generic Scale Note pool 32 in the key of C in Octave #0.

Based on the detected key for the audio file/song, a Global Key Offset 24 is established. This Global offset transposes all generic Scale Notes 32 from the generic key of C to Seed Notes 42 in the detected key. For example, if the detected key is F, the Global Key Offset 24 would be +5.

At step 1104 a basic pool of Sympathetic Seed Notes for the song is established by the application engine 1007 applying the Global Key offset to the scale notes contained in the Generic Key/Scale template. (Template Note) 32+ (Global Key Offset) 24=Seed Note Pool 42.

At step 1105 the user interface/display 1004 presents the user with a menu of possible play-along instruments 61 or instrument combinations. The menu is organized in ways to simplify selections such as organizing the instrument choices by Genre.

At step 1106 an Instrument-specific Base Pool of notes 71 is established by application engine 1007 for each selected instrument.

At step 1107 each Instrument selection comes with a predetermined (default) method to, trigger it (Trigger Type Pulse; One-shot etc). Upon user selection of an Instrument, the user may accept or change the triggering characteristics.

At step 1108 each Instrument selection comes with a default selection of playback templates shown in FIG. 10 that the user may accept or change. Playback templates are Melodic in nature and they dictate the melody sequence of sympathetic notes being played.

At step 1109, upon completion, all song selections & properties are saved by the application engine 1007 in an XML format that can be read, edited, and played, such as by Beamz Interactive software offered by Beam Interactive, Inc. of Scottsdale Ariz.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described herein may also be combined or replaced by alternative features serving the same, equivalent, or similar purpose without departing from the scope of the invention defined by the appended claims.

The invention claimed is:

1. A non-transitory computer readable medium including instructions operable by an electronic processor, comprising instructions for:

receiving an audio file from a remote source;

directly analyzing the audio file to map in audio form and create a virtual song definition configured for interactive playback;

performing chromatic analysis across a length of the audio file to create a song section in the virtual song definition, where each song section contains a regional key offset that is configured to transpose seed notes from a detected root key to regional specific seed notes for the song section in real-time; and performing tempo analysis on the length of the audio file to create a tempo region in the virtual song definition, where each tempo region contains a tempo value that establishes a playback tempo for the region.

2. The non-transitory computer readable medium as specified in claim 1, further comprising instructions such that when a tempo value marker is encountered during playback of the virtual song definition, a current tempo is set to a value contained in the tempo value marker.

3. The non-transitory computer readable medium as specified in claim 1, further including instructions to use pools of sympathetic notes that correspond to key changes as the audio file plays.

4. The non-transitory computer readable medium as specified in claim 3, further including instructions for associating an instrument to one said pool of sympathetic notes.

5. The non-transitory computer readable medium as specified in claim 1, further including instructions for associating a plurality of instruments to respective pools of sympathetic notes.

6. The non-transitory computer readable medium as specified in claim 4, further comprising instructions for assigning a melody template to each instrument's pool of sympathetic notes to govern how notes are retrieved and played.

7. The non-transitory computer readable medium as specified in claim 1, further comprising instructions for saving audio file definitions in a definition file.

8. The non-transitory computer readable medium as specified in claim 7, wherein definition file is an XML file.

9. A system, comprising:

a processor configured to:

receive an audio file from a remote source;

directly analyze the audio file to map and create a virtual song definition configured for interactive playback;

perform chromatic analysis across a length of the audio file to create song section objects in the virtual song definition, where each song section contains a regional key offset that is configured to transpose seed notes from a detected root key to regional specific seed notes for the song section in real-time; and perform tempo analysis on the length of the audio file to create tempo region objects in the virtual song definition, where each tempo region contains a tempo value that establishes a playback tempo for the region.

10. The system as specified in claim 9, wherein the processor is configured such that when a tempo value marker is encountered during playback of the virtual song definition, a current tempo is set to a value contained in the tempo value marker.

11. The system as specified in claim 9, wherein the processor is configured to use pools of sympathetic notes that correspond to key changes as the audio file plays.

12. The system as specified in claim 11, wherein the processor is configured to associate an instrument to one said pool of sympathetic notes.

13. The system as specified in claim 9, wherein the processor is configured to associate a plurality of instruments to respective pools of sympathetic notes.

14. The system as specified in claim 12, wherein the processor is configured to assign a melody template to each instrument's pool of sympathetic notes to govern how notes are retrieved and played.

15. The system as specified in claim 9, wherein the processor is configured to save audio file definitions in a definition file.

16. The system as specified in claim 15, wherein definition file is an XML file.

* * * * *